United States Patent [19]
Machida et al.

[11] Patent Number: 5,732,304
[45] Date of Patent: Mar. 24, 1998

[54] REDUCED WIDTH CAMERA CONSTRUCTION

[75] Inventors: Kiyosada Machida, Urawa; Junichi Omi, Kamagawa-ken, both of Japan

[73] Assignee: Nikon Corporation, Tokyo, Japan

[21] Appl. No.: 786,119

[22] Filed: Jan. 17, 1997

Related U.S. Application Data

[63] Continuation of Ser. No. 418,284, Apr. 7, 1995, abandoned.

[30] Foreign Application Priority Data

Sep. 5, 1994 [JP] Japan .................................. 6-211388

[51] Int. Cl.⁶ .................................................. G03B 15/03
[52] U.S. Cl. ............................ 396/539; 396/540; 396/535
[58] Field of Search ................................ 396/535, 539, 396/540, 158; D16/200, 218-220

[56] References Cited

U.S. PATENT DOCUMENTS

| | | | |
|---|---|---|---|
| 4,557,571 | 12/1985 | Reibl | 354/149.11 |
| 4,868,589 | 9/1989 | Taniguchi et al. | 354/149.11 |
| 4,945,372 | 7/1990 | Higuchi et al. | 354/288 |
| 5,028,949 | 7/1991 | Kawano | 396/158 |
| 5,202,719 | 4/1993 | Taniguchi et al. | 354/413 |
| 5,262,809 | 11/1993 | Nishimura et al. | 354/149.11 |
| 5,317,362 | 5/1994 | Takahashi | 354/418 |
| 5,323,203 | 6/1994 | Maruyama et al. | 354/410 |
| 5,424,794 | 6/1995 | McKay | 354/145.1 |
| 5,426,478 | 6/1995 | Katagiri et al. | 354/149.11 |
| 5,446,512 | 8/1995 | Mogamiya | 354/288 |

*Primary Examiner*—Safet Metjahic
*Assistant Examiner*—Michael Dalakis
*Attorney, Agent, or Firm*—Oliff & Berridge PLC

[57] ABSTRACT

A camera and its components are arranged to reduce the overall camera width while avoiding an increase in height. The camera includes a cartridge chamber and a spool chamber positioned to surround the lens barrel. The chambers and the barrel are aligned in a first direction. A region is defined adjacent the spool chamber in a second direction, substantially perpendicular to both an axial direction of the lens barrel and the first direction. A light-emitting unit of a flash device, a red-eye prevention light-emitting unit, which produces light that prevents the red-eye phenomenon, and a photometry unit, which outputs a signal corresponding to the subject field brightness, are provided in the region in a position to reduce the overall width of the camera.

7 Claims, 4 Drawing Sheets

5,732,304

REDUCED WIDTH CAMERA CONSTRUCTION

This is a continuation of application Ser. No. 08/418,284 filed Apr. 7, 1995, now abandoned.

BACKGROUND OF THE INVENTION

1. Field of the Invention

The present invention relates to a camera having a plurality of internal units, such as a photometry unit, a range measuring unit or the like, arranged in a row above the lens barrel. This arrangement permits a reduction in the camera width while not increasing the overall height.

2. Description of Related Art

As shown in FIG. 3, a conventional camera is provided with a cartridge chamber 3 and a spool chamber 4 positioned to the left and right of the lens barrel 2. Lens barrel 2 supports the shooting lens 1. A range measuring unit 5, a photometry unit 6, a viewfinder unit 7, a red-eye prevention light-emitting unit 8 and the light-emitting unit 9 of a flash device are arranged in a single lateral row in region A above the lens barrel 2. The edges of these components of the camera are toward the front of the camera.

The range measuring unit 5 detects the range of the subject using the triangulation principle emitting infrared light toward the subject from a light-emitting device 5a. The infrared light reflected by the subject is received by a light-receiving device 5b. The range measuring unit 5 outputs a signal corresponding to the detected range. The photometry unit 6 receives light incident on a photometry window 6a by means of a built-in light-receiving element. A signal corresponding to the subject field brightness is output from photometry unit 6. The viewfinder unit 7 is comprised of various optical elements such as a lens or lenses and a mirror or mirrors. The viewfinder unit 7 includes an object lens 7a positioned on the front of the camera and an eyepiece lens (not shown) positioned on the back of the camera. The red-eye prevention unit 8 controls the red-eye phenomenon of the subject at the time of flash photography. The red-eye prevention unit 8 emits light from a red-eye prevention lamp 8a before the light is emitted from the light-emitting unit 9. The light-emitting unit 9 is provided with a xenon tube 9a, which comprises the light source, and a reflector 9b.

In a region B below the spool chamber 4, a film winding gear array 10 is provided for transferring power from a motor (not shown) to a spool shaft (not shown) of the spool chamber 4. The spool shaft is vertically oriented. The rotation of the film winding gear array 10 is also transferred to the top of the cartridge chamber 3 by a transfer shaft 11. The rotation of the transfer shaft 11 is transferred to a fork 14 by a pair of gears 12 and 13. The fork 14 and a shaft (not shown) of the film cartridge 15 are loaded meshing together in the cartridge chamber 3, so film wound around the spool shaft of the spool chamber 4 can be rewound to the film cartridge 15 by the rotation of the fork 14. A condenser 16, which stores an electric charge for use in the flash device, is on the side of the cartridge chamber 3. As shown in FIG. 4, the light-emitting unit 9 of the flash device is thin compared to the thickness of the camera. An internal circuit 17, which controls the emitting of light by the light-emitting unit 9, is provided behind the light-emitting unit 9. A cover 18 shown in FIGS. 3 and 4, covers the internal structures of the camera.

With the above structure, the range measuring unit 5, the photometry unit 6 and the like are arranged to avoid the gears 12 and 13 and are positioned above the cartridge chamber 3. Units 5–9 are mounted in region A and are shifted toward the spool chamber 4. Therefore, even if the lens barrel 2 is made smaller, it is impossible to make the width of the camera smaller because the light-emitting unit 9 extends toward the side of the camera farther than the spool chamber 4. Even if the internal units of the camera could be positioned above gears 12 and 13, the width of the camera would be determined by the width of region A, due to the relationship between the number, shape and dimensions of the internal units 5–9. In the past, the red-eye prevention lamp 8a has been positioned inside the light-emitting unit 9, to reduce the width of region A. However, a large portion of the reflector 9b of the light-emitting unit 9 needs to be cut away, and thus, the guide number of the flash device falls.

SUMMARY OF THE INVENTION

It is an object of the present invention to provide a camera with its width reduced while avoiding increases to its height. The camera achieves this and other objects by providing a cartridge chamber and a spool chamber surrounding a lens barrel in a first lateral direction. This first lateral direction is substantially perpendicular to the axial direction of the lens barrel. Region A, adjacent the lens barrel, is substantially perpendicular to both the axial direction of the lens barrel and to the first lateral direction. A plurality of internal units for each of the camera functions are formed as single entities. The edges of the internal units are arranged in a row in the first lateral direction and are positioned toward the front of the camera. Furthermore, at least two of the internal units have relatively small dimensions in the second direction and are positioned adjacent each other in the second direction while maintaining a mutual separation. This positioning of the internal units on the camera achieves one of the objects of the invention.

The camera further achieves its objects by including a transfer mechanism transferring power to the spool chamber on one side of the spool chamber. At least two of the internal units are positioned adjacent each other on the other side of the spool chamber opposed the transfer mechanism.

In accordance with another aspect of the invention, there is provided a camera with a cartridge chamber and a spool chamber positioned to surround a lens barrel in a first lateral direction. This first lateral direction is substantially perpendicular to the axial direction of the lens barrel. Region A, adjacent the lens barrel, is substantially perpendicular to both the axial direction of the lens barrel and to the first lateral direction. A plurality of internal units for each function the camera are formed as single entities. The edges of the internal units are arranged in a row in the first lateral direction and are positioned toward the front of the camera. Furthermore, at least two of the internal units have small dimensions in the second direction and are positioned adjacent each other in the first lateral direction, maintaining a mutual separation. This positioning of the internal units on the camera achieves one of the objects of the invention.

Further objects of the invention are achieved by providing a space S behind the internal units positioned next to each other in the first lateral direction. Other camera components can be positioned in this space.

BRIEF DESCRIPTION OF THE DRAWINGS

Preferred embodiments are described with reference to the drawings, in which like reference characters denote like elements throughout the figures, and in which.

DESCRIPTION OF PREFERRED EMBODIMENTS

Figure 1:
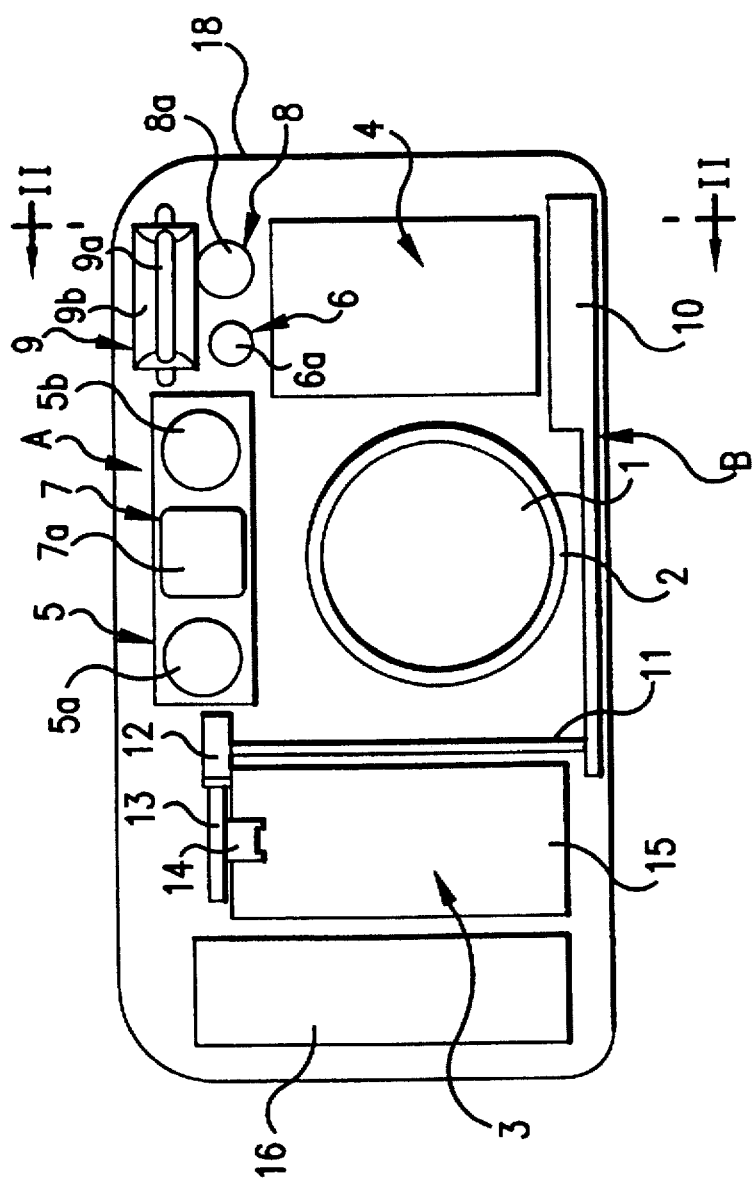
FIG. 1 is a drawing illustrating the internal units on a camera according to the present invention, seen from the front of the camera.
Figure 2:
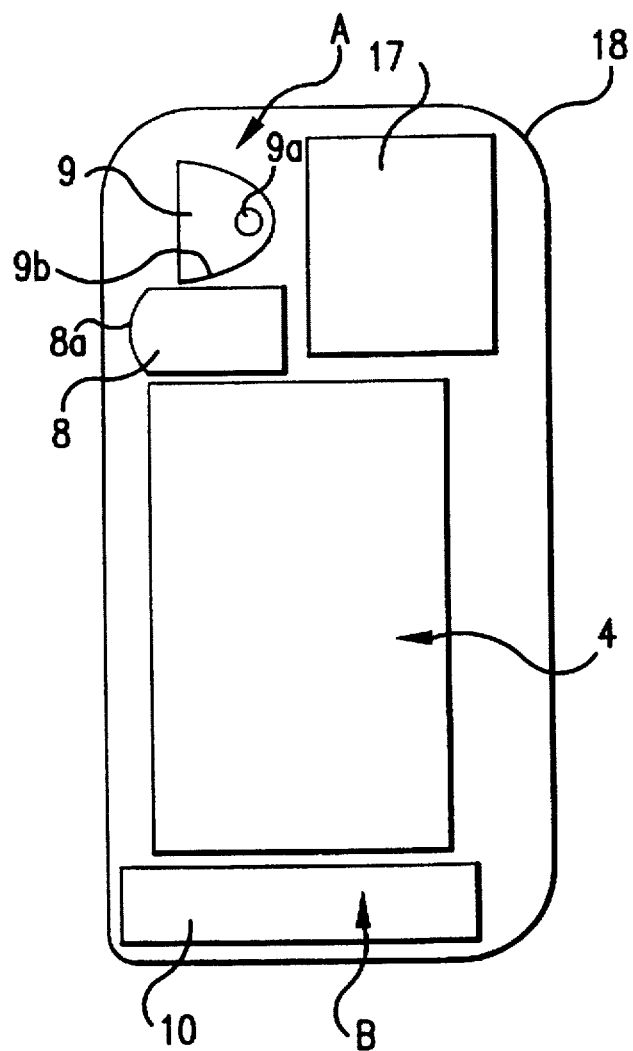
FIG. 2 is a cross-section taken along line II—II in FIG. 1.
Figure 3:
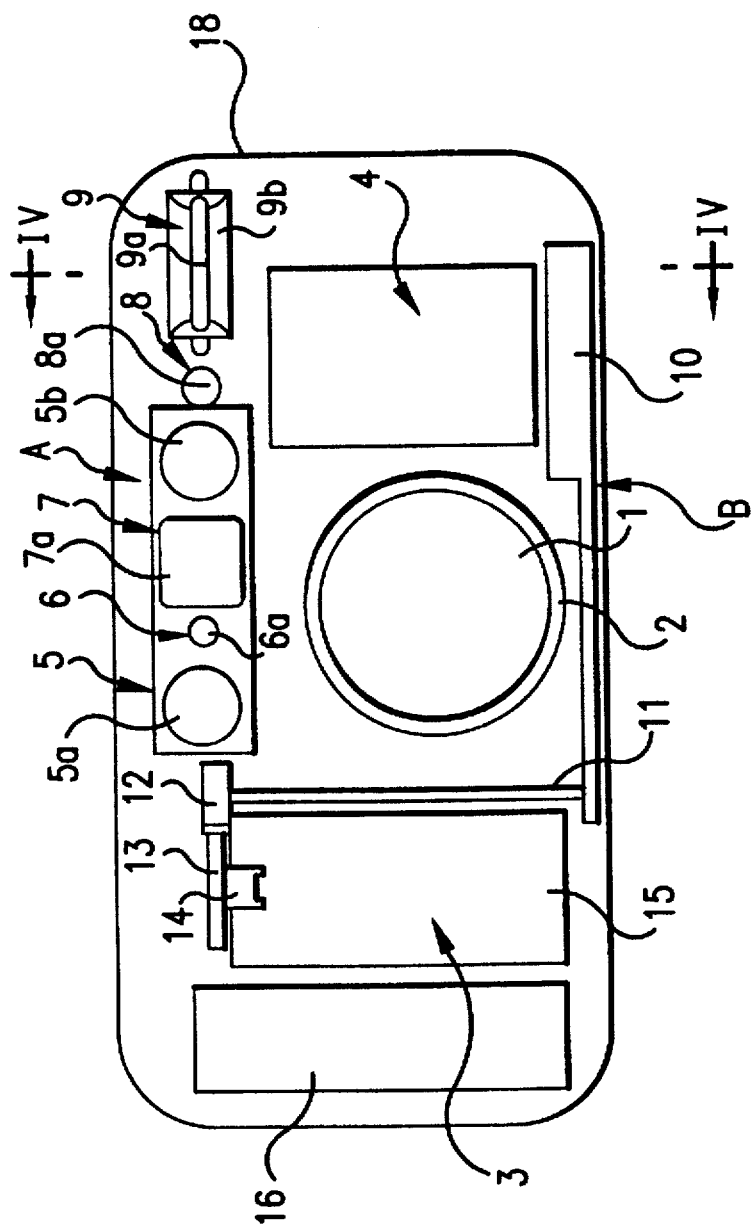
FIG. 3 is a drawing illustrating the internal units on a conventional camera, seen from the front of the camera.
Figure 4:
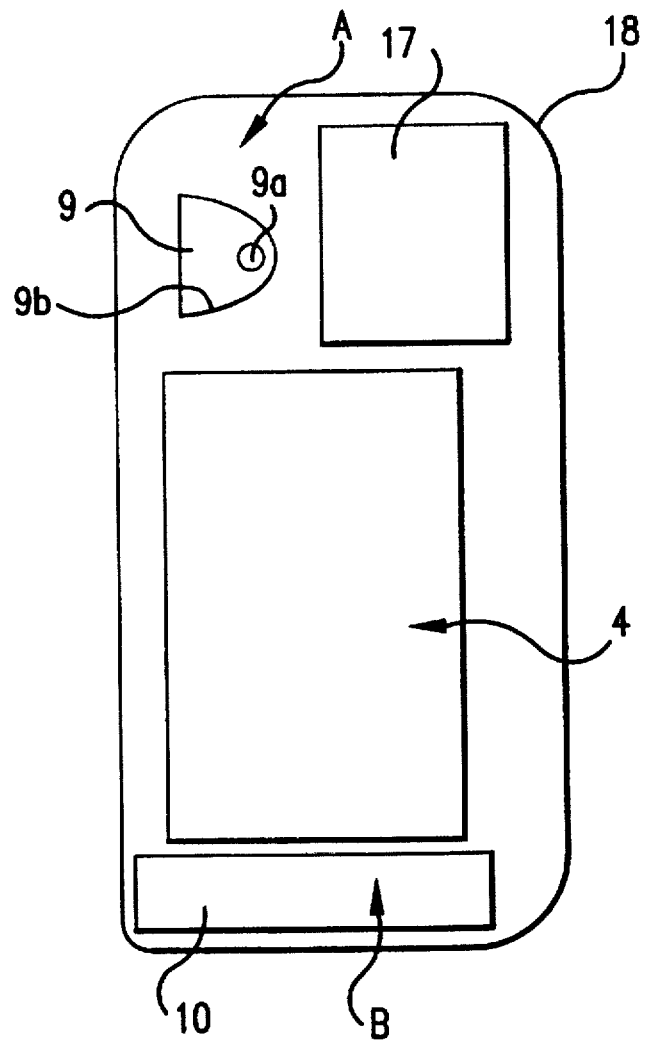
FIG. 4 is a cross-section taken along line IV—IV in FIG. 3.

A preferred embodiment of the present invention described hereafter, with reference to FIGS. 1 and 2. FIGS. 1 and 2, the components that are the same as equivalent to those in FIGS. 3 and 4 are represented same reference numbers. A repeated explanation of same is omitted. The term "thickness" refers to the axial direction of the lens barrel, "width" refers to the film winding direction and "height" refers to the direction perpendicular to both the film winding direction and the axial direction of the lens barrel.

A camera includes a cartridge chamber 3 and a spool chamber 4, which are positioned to surround the lens barrel 2 in a first lateral or the left-right direction in FIG. 1. The lens barrel 2 supports the shooting lens 1. The first lateral direction is substantially perpendicular to the axial direction (perpendicular to the plane of the drawing in FIG. 1) of the lens barrel 2.

A region A is defined adjacent and above the lens barrel 2. As shown in FIG. 1, a photometry unit 6 and a red-eye prevention light-emitting unit 8 are aligned between a light-emitting unit 9 and the spool chamber 4 in region A. The photometry unit 6 is closer to the lens barrel 2. The photometry unit 6, the red-eye prevention light-emitting unit 8 and the light-emitting unit 9 have a relatively small height, compared to a range measuring unit 5 and a viewfinder unit 7. With the arrangement shown in FIG. 1, it is possible to keep the upper edge of the light-emitting unit 9 substantially the same as that of the range measuring unit 5 and the viewfinder unit 7. The red-eye prevention light-emitting unit 8 does not extend beyond the side of the light-emitting unit 9 because the photometry unit 6 and the red-eye prevention light-emitting unit 8 have a width that is relatively small compared to the width of the light-emitting unit 9. Through this arrangement, the space below the light-emitting unit 9 is effectively utilized. The width needed to position each of the units 5–9 in region A is reduced. It is therefore possible to make a camera having a smaller width.

The thickness of the photometry unit 6, the light-emitting unit 9 and the red-eye prevention light-emitting unit 8 in the camera is also small. It is possible to use the space behind the light-emitting unit 9 for an internal circuit 17, which controls the emitting of light by a flash device, as shown in FIG. 2.

With the arrangement shown in FIG. 3, the photometry unit 6 is positioned between the light-emitting device 5a of the range measuring unit 5 and the viewfinder 7. Therefore, in conventional devices it is difficult to utilize the space behind the photometry unit 6 even though the unit has a small thickness. However, with the present invention as shown in FIG. 1, it is possible to effectively utilize the limited space because the light-emitting unit 9 and the red-eye prevention light-emitting unit 8 maintain a mutual separation. Further, by providing mutually separated internal devices, it is possible to make the guide number of the flash device larger than when the red-eye prevention light-emitting lamp 8a is provided within the reflector 9b of the light-emitting unit 9.

The light-emitting device 5a and light-receiving device 5b of the range measuring unit 5, the viewfinder unit 7 or the photometry window 6a of the photometry unit 6 will not be covered by a photographer's hand on the right side of the camera. This is because the cartridge chamber 3 is positioned to the right of the camera (left in FIG. 1) and also because the range measuring unit 5 and the viewfinder unit 7 are shifted toward the spool chamber 4, not above the cartridge chamber 3. However, the invention could also include an arrangement where the cartridge chamber 3 is positioned to the left of the camera.

A region B below the spool chamber 4, includes film winding gear array 10 for transferring power from motor (not shown) to a spool shaft of the spool chamber 4. The spool shaft is positioned in the vertical or second direction. The rotation provided to the film winding gear array 10 is transferred to the top of the cartridge chamber 3 by a transfer shaft 11. The rotation of the transfer shaft 11 is transferred to a fork 14 by a pair gears 12 and 13. The fork 14 and a cartridge shaft shown) are loaded meshing together in the cartridge chamber 3, so film wound around the spool shaft of spool chamber 4 can be rewound to the cartridge 15 by the rotation of the fork 14. A condenser 16 stores an electric charge for the flash device and is positioned on the side of the cartridge chamber 3. As shown in FIG. 4, the light-emitting unit 9 of the flash device is thin compared to the camera thickness. An internal circuit 17, which controls the emitting of light by the light-emitting unit 9, can be provided behind the light-emitting unit 9 because it is thin. A cover 18 shown in FIGS. 3 and 4, covers the internal structures of the camera.

The present invention is not limited to only components including a photometry unit 6, the red-eye prevention light-emitting unit 8 and the light-emitting unit 9. If other camera components having a small height are to be used in a camera, they may be positioned appropriately adjacent each other. If there are other camera components that have a small width, they may be positioned beside each other.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A compact camera of reduced height and width dimensions, including:

a lens barrel having a longitudinal axis;

a cartridge chamber;

a spool chamber, wherein the cartridge chamber and the spool chamber are positioned on opposite sides of the lens barrel in a first direction orthogonal to the longitudinal axis;

a plurality of internal camera function units positioned in a region substantially adjacent the lens barrel and within a main body of the camera, the plurality of internal camera function units being aligned substantially parallel to the first direction and extending to a front side of the camera, one of the internal camera units being a light emitting unit of a flash device having a narrow height in a second direction perpendicular to the first direction relative to one or more of the remaining plurality of internal camera units positioned in the first direction, said light emitting unit of a flash device and said spool chamber being aligned in the second direction; and at least one additional internal camera unit having a narrow height in the second direction positioned between said light emitting unit of a flash device and said spool chamber, said at least one additional internal camera unit and said light emitting unit forming a combined height in the second direction substantially the same as a largest one of said plurality of internal camera units so that the camera main body can retain a compact size.

2. The camera according to claim 1, wherein said plurality of internal camera units are selected from the group consisting of the light emitting unit of a flash device, a red-eye prevention light emitting unit, a photometry unit, a rangefinder, and a viewfinder.

3. The camera according to claim 1, wherein said at least one additional internal camera unit is selected from the group consisting of a red-eye prevention light emitting unit and a photometry unit.

4. A compact camera of reduced height and width dimensions, including:

a camera main body;

a lens barrel having a longitudinal axis;

a cartridge chamber;

a spool chamber, wherein the cartridge chamber and the spool chamber are positioned on opposite sides of the lens barrel in a first direction orthogonal to the longitudinal axis;

a plurality of internal camera function units positioned in a region substantially adjacent the lens barrel and within the camera main body, the plurality of internal camera function units being aligned substantially parallel to the first direction and extending to a front side of the camera, one of the internal camera units being a light emitting unit of a flash device having a narrow height in a second direction perpendicular to the first direction relative to one or more of the remaining plurality of internal camera units positioned in the first direction and a narrow thickness measured along the longitudinal axis, said light emitting unit of a flash device and said spool chamber being aligned in the second direction;

at least one internal camera unit located rearward of said light emitting unit of a flash device along the longitudinal axis, said at least one internal camera unit having a height greater than said light emitting unit such that said at least one internal camera unit extends downward in the second direction toward said spool chamber by an extent greater than said light emitting unit; and at least one further internal camera unit having a narrow height in the second direction positioned between said light emitting unit of a flash device and said spool chamber, said at least one further internal camera unit having a thickness no more than the thickness of said light emitting unit.

5. The camera according to claim 4, wherein said at least one additional internal camera unit is a circuit board connected to said light emitting unit.

6. The camera according to claim 5, wherein said at least one further internal camera unit is selected from the group consisting of a red-eye prevention light emitting unit and a photometry unit.

7. The camera according to claim 6, wherein said at least one further internal camera unit includes both said red-eye prevention light emitting unit and said photometry unit, said light emitting unit and said red-eye prevention light emitting unit and said photometry unit all being electrically connected to said circuit board so as to provide a compact size with reduced wiring due to the close proximity with said circuit board.

* * * * *